Jan. 5, 1954

C. J. McKINNEY 2,664,603

WINDOW CHANNEL CONSTRUCTION

Original Filed July 1, 1947

INVENTOR
CARLOS J. McKINNEY
BY
Evans & McCoy
ATTORNEYS

Patented Jan. 5, 1954

2,664,603

UNITED STATES PATENT OFFICE 2,664,603

WINDOW CHANNEL CONSTRUCTION

Carlos J. McKinney, Detroit, Mich., assignor to The General Tire & Rubber Company, Akron, Ohio, a corporation of Ohio Original application July 1, 1947, Serial No. 758,319. Divided and this application July 11, 1950, Serial No. 173,037

6 Claims. (Cl. 20—69)

This invention relates to window construction and more particularly to the sealing of windows such as are used in automotive vehicles and which have movable lights or glass.

The doors and bodies of automobiles and other vehicles customarily have window openings fitted with movable lights or glass panels and such openings may be provided with contour sealing strips or "wind-lacing" which serve as weather seals between the window frames and the movable glass lights and which also cushion the glass to minimize rattling of the latter. Many window contours are intricate, involving acute angles and short radius bends.

In order to provide these more intricate window contours with sealing strips, the general practice has been to install one strip along the horizontal bottom portion of the window and a second U-shaped channel strip around the remaining portion of the window.

One of the principal objects of the present invention is to provide a type of sealing strip which will fit completely around a window contour and eliminate the necessity for using two types of sealing strip on each window with the corresponding advantages from the reduction in costs of manufacture and assembly.

Various constructions and designs embodying cross slits in a metal strip to permit edgewise bending have been evolved, but these have been found to lack strength and durability. Consequently, contour weather stripping without transverse slots which is also capable of being bent around the short radius bends is to be preferred because of its greater strength and durability. Because of the difficulty of bending said metal strip without buckling and crimping, however, this has been difficult to develop.

Another object of the invention is to provide a generally improved unslotted, bendable, and continuous edge type of contour sealing strip or "wind-lacing" for vehicle windows having movable lights or panels; more particularly to provide, in combination with a window structure having a frame including a glass receiving channel, a liner comprising a thin metal strip with which is assembled a ribbon or cushion of deformable glass contacting material.

It is another object of the invention to provide, in the combination mentioned, an improved means for attaching the sealing or contour strip to one wall of the glass receiving channel of the window structure.

Another object is to provide, in combination with a window structure having a glass receiving channel, a liner serving as an ornamental trim or finish for the edge of the window frame and also as a seal for contacting the glass light of the window assembly.

A further object of the invention is to provide an improved method of assembling a contour sealing strip in a window structure wherein one continuous metal portion of the sealing strip is positioned and secured to the glass receiving channel wall and thereafter a continuous deformable glass contacting body or strip is assembled with the metal portion by interfitting the same therewith and the parts are held in assembled relation by means of the interfitting relationship.

Still further objects and advantages of the invention reside in certain features of construction and arrangements of parts which will become apparent as the following detailed description of the invention is made. This description is made in connection with the accompanying drawings wherein.

Figure 1:
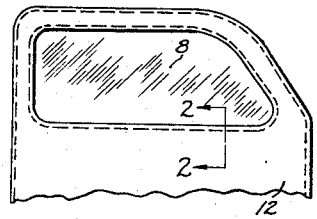
Figure 1 is a fragmentary side elevational view of an automotive vehicle door showing the window therein.

The contour or sealing strip of the present invention may be used around window openings of various shapes in either the door or the body of an automobile. Fig. 1 illustrates a window contour or shape that is used in automobile doors. The construction of a door of this type includes inner and outer sheet metal panels 11 and 12 (Fig. 2) that are formed as by stamping and have the desired contours and configurations. These panels are marginally secured together and have strengthening cross members, not shown. Around the window opening, the panels are curved inwardly toward one another providing frame contours 14. The marginal edges of the panels are bent or formed at an angle to the frame contours 14 to provide spaced generally parallel wall portions 15 disposed in confronting relation to one another and providing glass receiving channel.

The window opening is fitted with a movable panel or glass light 8 which is raised and lowered by a mechanical operator, not shown, having connection with a channel member 16 secured along the bottom edge of the glass.

To guide the movement of the glass 8 in the channel formed between the confronting wall portions 15 of the window frame, a liner in the form of a sealing or contour strip is supported on the edge of each of the panel walls 15.

Figure 3:
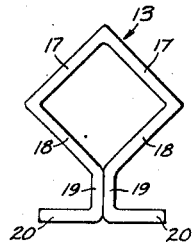
Fig. 3 is an enlarged plan view of one of the spring wire fasteners used to hold the sealing strip in assembled relation with the wall of the glass channel.
Figure 2:
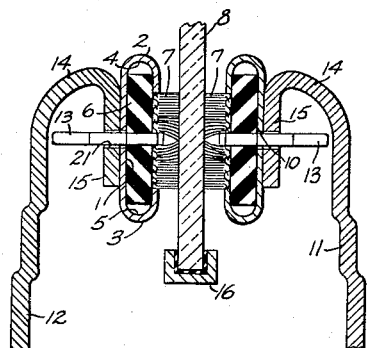
Fig. 2 is a sectional detail through the window of Fig. 1 taken substantially on the line 2—2 of Fig. 1 and enlarged with respect to that figure.

By making the liner shell of very thin sheet metal, it can be sufficiently deformed to bend it edgewise around curves of small radius in adapting it to complex automobile window contours. The thin sheet metal used, which may be as thin as from about 22 to about 36 gauge, preferably about 28 gauge, is strengthened and reinforced against undesirable deformation and mutilation in use by having its side marginal edges rolled toward one another. For example, a contour or sealing strip constructed in accordance with the principles of the present invention is shown in Figs. 2 and 3 wherein the sheet metal strip includes a web portion 1, having side marginal edges 2 and 3 bent or rolled toward one another providing spaced parallel channels 4 and 5 which are disposed in confronting relation to one another wholly on one side of the plane of the web.

A cushion body or ribbon 6 is disposed against the web 1 of the metal strip and extends longitudinally thereof. The cushion ribbon may be a plastic compound such as reclaimed rubber calendered or extruded in sheet form and adhered to the web of the metal strip. The marginal side edges of the cushion body 6 are received in the channels 4 and 5 of the metal strip and the cushion body is thus held in place by an interlocking arrangement and wholly within the confines of the metal shell.

Extending laterally from the central portion of the cushion body or ribbon 6 are a multiplicity of hair-like filaments or fabric tufts 7 which are of resilient nature and serve to engage the movable glass window light 8 to form a weather seal theragainst and to cushion the glass so as to prevent rattling thereof. The tufts 7 may be individually embedded in the cushion body 6 so as to extend therefrom in generally parallel relation to one another. A convenient construction is one in which the tufts 7 are formed on a woven strip of fabric material and such fabric is bonded to or partially embedded in the surface of the cushion body 6.

The rubber or plastic body or ribbon 6 is extruded in place on the web 1 of the metal strip, the latter being passed through the extruding die. While the plastic or rubber composition is hot and tacky as it emerges from the extruding die, a fabric strip having the tufts 7 is immediately applied thereto and pressed in place by rollers. The channels 4 and 5 may be formed by rolling the edges 2 and 3 of the strip before it is passed through the extruding die or, alternatively, the cushion body 6 and the tufted fabric may be first applied to the strip and then the edges 2 and 3 rolled about the edges of the cushion body to form the channels. The rubber composition is compounded to have a consistency corresponding to that of stiff putty so that the fabric becomes strongly bonded to or partially embedded therein. The assembled strips are cured in an autoclave or similar heater.

At uniformly spaced intervals along the length of the thin metal strip, a series of elongated openings 10 are formed centrally in the web portion 1. These openings are elongated in the direction of the strip length and are preferably formed prior to the application of the deformable cushion 6 to the strip so that the openings are covered or sealed by the material of the cushion.

In mounting the contour strips in the channel of a window opening, spring metal fasteners 13 such as shown in Fig. 3 may be used. These fasteners extend through the elongated openings 10 and through similar openings or slots 21 formed in the walls 15 of the glass receiving channel. The spring fasteners have an interlocking action which retains the parts in assembled relation.

The spring metal fasteners 13 are bent from strips of resilient steel or brass wire. Each fastener is of integral or "one-piece" construction and has a pointed end formed by a central bend from which extend angularly disposed divergent portions 17. Convergent portions 18 are formed as continuations of the divergent portions. Where the convergent portions 18 come together, they are bent to form parallel portions 19 that are disposed adjacent one another and terminate in angularly disposed divergent feet 20.

Prior to assembling the parts of the window structure, the contour strips are first preformed on a machine or by hand with jigs and forms to fit the window shape. If desired, the strip can be used only on the lower, horizontal section of the window. In order to reduce production and assembly costs, however, and to take full advantage of this invention, the strip should be preformed or shaped to fit completely around the window. After the strip has been shaped, the web portions 1 of the thin metal contour strips or sheets are disposed flatwise against the channel walls 15 with the elongated openings 10 of the contour strips aligned with the corresponding openings 21 in the walls 15. The spring metal fasteners 13 are forced or pushed through the aligned openings with the point of the divergent portions 17 being foremost and serving as a drift to center or locate the parts. While inserting the fastener, the latter may yield and be deformed temporarily by bending so that the convergent portions 18 cross one another, the distance across the widest portion of the fastener normally being greater than the length of the individual slots 10.

When the individual fasteners are in place, the convergent walls 18 thereof engage in the ends of the slots 21 formed in the channel walls 15 and by reason of the resiliency of the metal fastener tend to draw the contour strip tightly against the channel walls, the feet 20 of the fastener being drawn so as to bear against the web portions 1 of the contour strips beyond the ends of the slots 10.

In Figs. 5 through 8 is illustrated a modification of the invention wherein the thin metal strip or shell of the seal and the deformable cushion body or ribbon thereof are formed or made separately and are assembled in place on the window structure. The metal strip is substantially the same as that previously described and the parts thereof have been indicated by the same numerals of reference as used in connection with the preceding figures. These figures show a fragment of but one of the side panels of the door, it being understood that the other door panel and the sealing of contour strip mounted thereon for the other side of the glass receiving channel may be similarly constructed and assembled.

Figure 5:
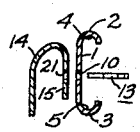

Fig. 5 shows the relative order of assembly of the parts, the web 1 of the metal strip being disposed in parallel relation to the wall portion 15 of the window frame with the slots 10 of the contour strip aligned with the slots 21 of the frame flange. The fastening elements 13 constructed as shown in Fig. 3 are then inserted through the aligned slots to retain the parts in assembled relation with the web 1 of the metal strip held snugly against the inturned wall forming flange 15 of the window frame.

Figure 6:
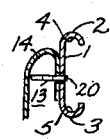
Figs. 5-8 are somewhat diagrammatic sectional details showing successive steps in assembling the liner of the present invention in a window structure in accordance with the method of the present invention.

The assembled parts are illustrated in Fig. 6 which shows the manner in which the feet 20 of the fasteners 13 engage the web 1 of the metal strip to hold the latter against the wall of the glass channel.

The deformable cushion body or ribbon for this modified form of contour sealing strip is indicated at 23 and corresponds to the body or ribbon 6 previously described. Tufts 24 are applied to or partially embedded in the deformable cushion 23, and correspond to the tufts 7 previously described. The deformable body 23 carrying the tufts 24 is made separately from the metal strip and is calendered or extruded to the desired shape and cured so as to have shape retaining resiliency. The rolled edges 2 and 3 are formed on the metal strip prior to assembly with the window frame providing the channels 4 and 5.

Figure 7:
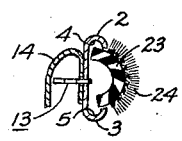
Figure 8:
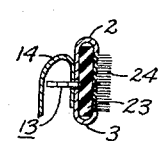
Figure 4:
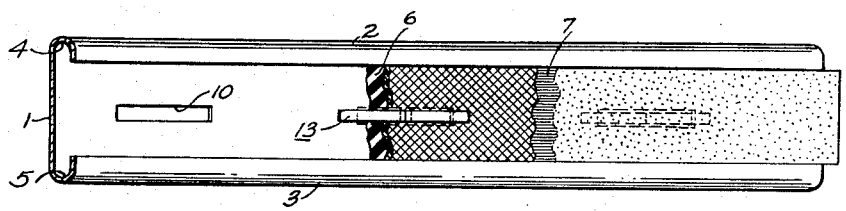
Fig. 4 is an elevational view, partly in section and with parts broken away and removed, of the window liner shown in Fig. 2 and enlarged with respect to that figure.

After the metal strip has been secured to the window frame in the manner described, the deformable body ribbon carrying the tufts 24 is interfitted with the metal strip by pinching the edges of the body together to clear the inturned rolled edges of the metal strip, as shown in Fig. 7. The resiliency of the deformable body enables it to resume its natural or unstressed shape, the edges thereof expanding into the channels 4 and 5 of the metal strip so that the deformable body or ribbon is held or interlocked in the metal strip as shown in Fig. 8.

The arrangement described in connection with Figs. 5 through 8 is particularly advantageous because it provides for replacement of the deformable body 23, and the tufts 24 should the latter become worn or damaged. To replace the tufted cushion ribbon, the latter is merely pried loose and pulled out of the channels of the metal strip shell and a new resilient ribbon carrying tufts is assembled with the metal strip in the manner described.

The metal strip of this and the other embodiments of the invention provides an attractive trim strip which outlines the entire periphery of the window. An ornamental paint is applied to the strip prior to assembly in the window structure, or the strip is plated with a bright metal such as nickel or chromium.

This application is a division of application Serial No. 758,319, filed July 1, 1947, and now U. S. Patent No. 2,523,839.

The principles of the present invention may be utilized in various ways, numerous modifications and alterations being contemplated, substitution of parts and changes in construction being resorted to as desired, it being understood that the embodiments shown in the drawings and described above and the particular method set forth are given merely for purposes of explanation and illustration without intending to limit the scope of the claims to the specific details disclosed.

What I claim is:

1. In combination with a window structure having a frame providing a glass receiving channel including a substantially flat wall portion, a liner comprising a thin metal strip having a substantially flat web portion disposed flatwise against the channel wall portion, marginal side portions of said strip being rolled toward one another providing spaced parallel channels disposed in confronting relation to one another, a series of elongated openings formed in the web of the strip, apertures in the channel wall aligned with the strip openings, resilient means extending through the openings and apertures and having interlocking connection with the strip and the channel wall to retain the strip against the wall, a ribbon of resilient rubberlike material of substantially the same width as the width of the flat web portion and of a thickness less than the thickness of the channels interlocked in the channels of the strip and tufted cushion material extending laterally from said ribbon for contacting a glass window in the channel.

2. A liner for a window glass channel or the like comprising a continuous sheet metal strip having a substantially flat central web portion and marginal side portions rolled toward one another providing spaced parallel channels disposed in confronting relation to one another and wholly on one side of the plane of the web portion of the strip, a ribbon of resilient cushioning material disposed against the web portion of the strip and having its side edges received in the channels whereby the ribbon is interlocked with the strip and retained in assembled relation thereto, and a multiplicity of deformable glass contacting tufts secured to the ribbon and extending laterally therefrom between the rolled side portions of the strip.

3. In combination with a window structure having a frame providing a glass receiving channel including a substantially flat wall portion, a liner comprising a thin metal strip disposed flatwise against the channel wall portion and having spaced apertures therein, a cushion ribbon with tufted material thereon disposed against the strip along the length thereof, and resilient fasteners extending through the strip openings and into the wall of the glass receiving channel to retain the parts in assembled relation, the marginal edge portions of the strip being formed in confronting relation about the cushion ribbon edges to hold such ribbon in place.

4. In combination with a window structure having a frame providing a glass receiving channel including a substantially flat wall portion, a liner comprising a thin metal strip having a substantially flat web portion disposed flatwise against the channel wall portion, the strip being formed to provide spaced confronting channels, a cushion ribbon disposed against the web portion of the strip and having edges received in the channels of the strip, a glass engaging tufted cushion narrower than the cushion ribbon disposed against the latter and means fastening the glass engaging ribbon to the cushion ribbon to retain the parts in assembled relation.

5. In combination with a window structure having a frame providing a glass receiving channel including a substantially flat wall portion, a liner comprising a thin metal strip having a substantially flat web portion disposed flatwise against the channel wall portion, marginal side portions of said strip being rolled toward one another providing spaced parallel channel disposed in confronting relation to one another, a resilient ribbon of substantially the same width as that of said metal strip disposed against said web portion with its edge portions received in said spaced parallel channels, deformable glass contacting material secured to the ribbon and extending laterally therefrom between the rolled side portions of the strip, and resilient fastening elements spaced along the liner and extending through the web portion thereof and through the glass channel wall to secure the liner to such wall.

6. The combination of claim 5 in which the resilient fastening elements comprise a single piece of resilient metal wire bent to provide a point and divergent portions extending therefrom, the divergent portions terminating in bends which are continuous with convergent portions, and each of the convergent portions having an angularly disposed foot connected thereto and movable therewith upon deformation of the wire.

CARLOS J. McKINNEY.

References Cited in the file of this patent

UNITED STATES PATENTS

| Number | Name | Date |
|---|---|---|
| 2,169,503 | Schlegel | Aug. 15, 1939 |
| 2,191,412 | Pihl | Feb. 20, 1940 |
| 2,286,988 | Jones | June 16, 1942 |
| 2,443,959 | Merrill | June 22, 1948 |
| 2,500,297 | Schunk | Mar. 14, 1950 |